April 17, 1956   W. W. NOLAN ET AL   2,741,922
STARTING ARRANGEMENTS FOR GYROSCOPIC INSTRUMENTS
Filed March 14, 1952   2 Sheets-Sheet 1

INVENTORS
WILLIAM W. NOLAN
JOHN S. GARWOOD
BY
Arthur H. Serrell
ATTORNEY

April 17, 1956   W. W. NOLAN ET AL   2,741,922
STARTING ARRANGEMENTS FOR GYROSCOPIC INSTRUMENTS
Filed March 14, 1952   2 Sheets-Sheet 2

INVENTORS
WILLIAM W. NOLAN
JOHN S. GARWOOD
BY
Arthur H. Serrell
ATTORNEY

United States Patent Office 2,741,922
Patented Apr. 17, 1956

2,741,922
STARTING ARRANGEMENTS FOR GYROSCOPIC INSTRUMENTS

William W. Nolan, Jamaica, and John S. Garwood, Searington, N. Y., assignors to Sperry Rand Corporation, a corporation of Delaware Application March 14, 1952, Serial No. 276,621

19 Claims. (Cl. 74—5.7)

This invention relates to gyroscopic instruments and particularly concerns an improved starting arrangement for such instruments by which the rotor frame thereof is quickly torqued to an erected position and when so positioned is locked relative to its major axis of freedom by means of the quick torquing device. The improved arrangement functions prior to and during the initial stage of energization of the rotor spinning means to prevent precession or nutation of the rotor frame about its major and minor axes as the rotor initially accelerates from a standstill condition.

An object of the present invention is to shorten the starting period of a gyroscopic reference instrument so that the same is properly conditioned for its intended use without the need of any standby warmup period. Such an invention is particularly useful where the gyroscopic reference instrument is employed as a visual flight indicator or, an automatic pilot component, or a remote attitude reference on a high speed aircraft.

One of the features of the present invention is the provision of a combination torquing and locking device effective about the major axis of the gyroscopic reference instrument.

Another feature of the invention resides in including in the starting arrangement a means for automatically extending the starting period when the instrument is subject to a temperature below a predetermined value.

Figure 1:
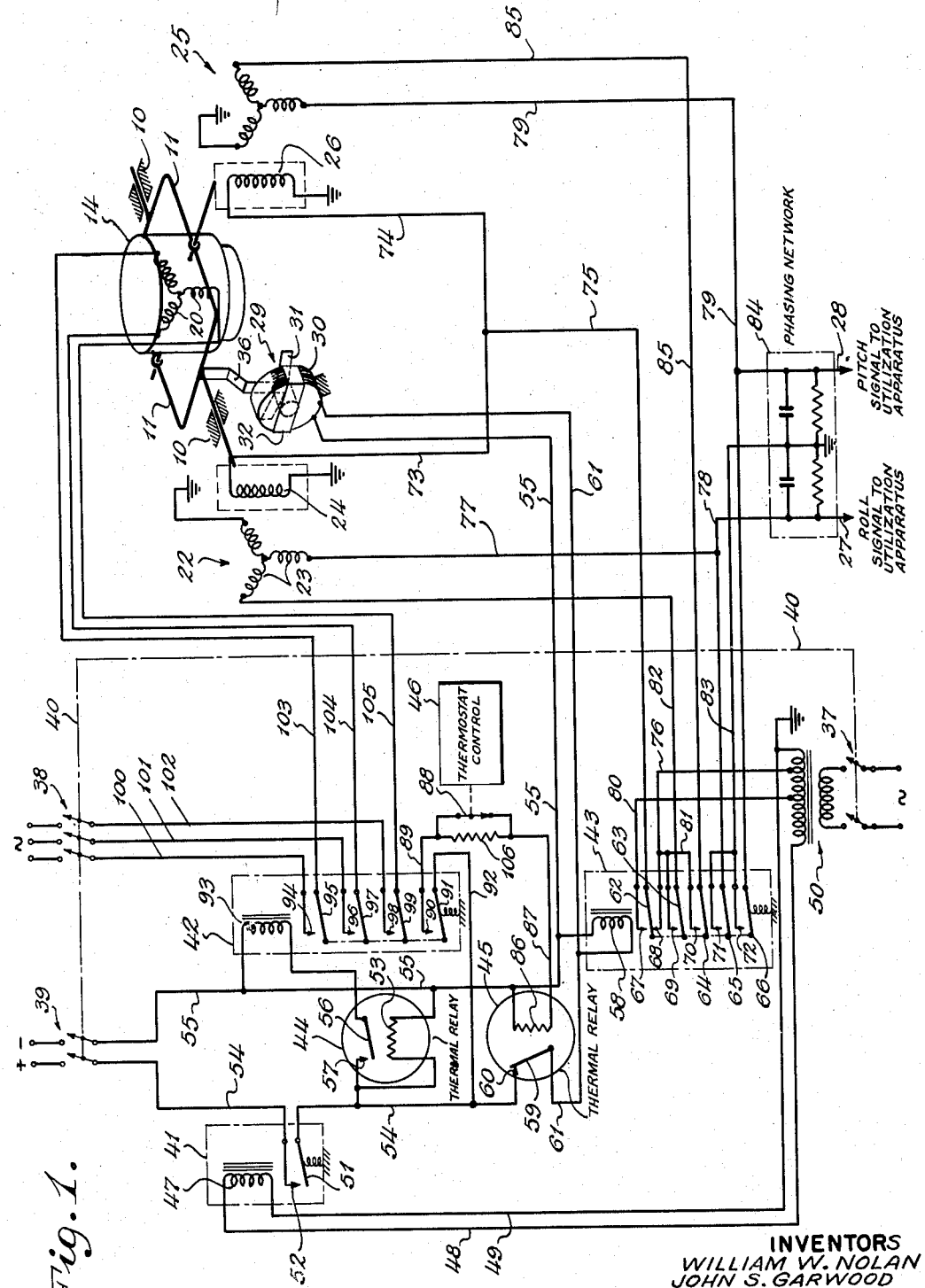
Figure 2:
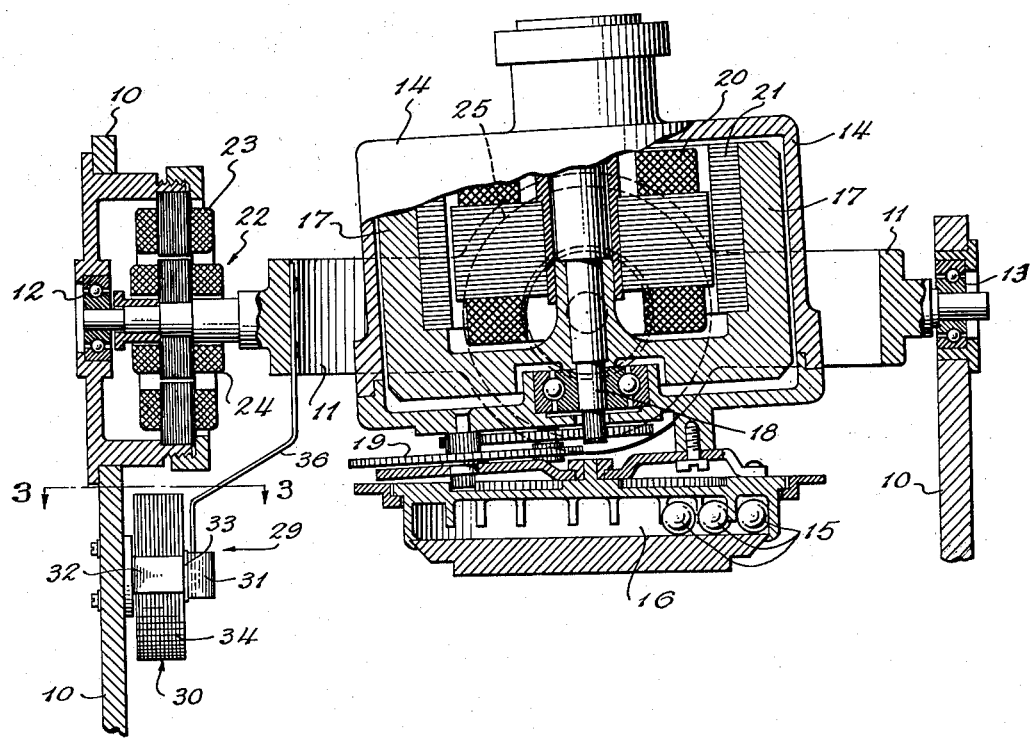
Figure 3:
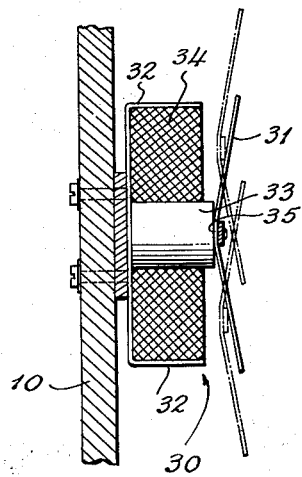

Other objects, features and structural details of the invention will be apparent from the following description when read in relation to the accompanying drawings, wherein:

Fig. 1 is a schematic view and wiring diagram showing the relation and connections between the elements constituting our improved starting arrangements for gyroscopic instruments, Fig. 2 is a vertical section of a gryoscopic instrument in which the present inventive concepts are embodied, and Fig. 3 is an enlarged detail sectional view taken on line 3—3, Fig. 2, showing the combination torquing and locking device employed in the improved starting arrangement.

For purposes of illustration, the present inventive concepts are shown adapted for use in a gyroscopic reference instrument of the gyro vertical type with an erecting means of the character shown and described in the copending application of Clare E. Barkalow, S. N. 670,263, filed May 16, 1946, now U. S. Patent 2,603,095. The instrument illustrated in Fig. 2 is one that is primarily useable to provide an automatic pilot attitude reference or other remote attitude reference wherein no direct visual indication is provided. With reference to Fig. 2, the improved instrument, as shown, includes a casing 10 that is suitably fixed to the craft. A further element of the improved instrument is provided by a gimbal ring 11 of conventional structure that is mounted with freedom in casing 10 about an axis corresponding with or parallel to the fore and aft axis of the craft by means of bearings 12 and 13.

The rotor frame element of the instrument as indicated at 14, is mounted in a conventional manner by means of bearings (not shown) in ring 11 with freedom about an axis corresponding with or parallel to the athwartship axis of the craft. Frame 14 is universally supported in casing 10 by means of ring 11 with freedom about normally horizontal, mutually perpendicular axes, the major axis of which is identified as the axis of the ring and the minor axis of which is identified as the axis of the rotor frame 14 on the ring.

The erecting means shown in Fig. 2, includes a plurality of movable balls 15 situated in a rotatable container 16 located at the bottom of the frame 14. The container 16 is driven by the gyroscopic rotor element of the instrument indicated at 17, the shaft 18 of the rotor being connected thereto by way of suitable reduction gearing 19. The rotor 17 as shown in Fig. 2 is mounted in frame 14 to spin about an axis that is substantially vertical, the erecting means being effective during normal operation of the instrument to maintain the spin axis of the rotor in the position illustrated. The instrument further includes rotor spinning means which may take the form of an alternating current induction motor of the squirrel cage type, as illustrated, whose wound stator 20 is fixed to the frame 14. The cage type rotor of the rotor spinning motor shown, as indicated at 21 is included as a part of the gyroscopic rotor 17. Parts corresponding to those described are correspondingly numbered in the schematic representation of the gyro instrument shown in Fig. 1.

The illustrated gyro vertical also includes a pick-off or electrical signal generator for each of the axes of the rotor frame 14. The roll pick-off indicated at 22 in Figs. 1 and 2 may be an electrical signal transmitter of the selsyn type whose stator 23 is suitably fixed to the casing 10 and whose rotor 24 is stabilized by the rotor frame 14 through gimbal 11. Rotor 24, as shown, is fixedly connected to one of the trunnions of the gimbal ring 11. The pitch pick-off indicated at 25 in Fig. 1 is also shown in the form of a selsyn transmitter whose rotor 26 is connected to the frame and whose stator is mounted on the gimbal ring 11. The described pick-offs are of a well known type, the same providing signals proportional to the amplitude and sense of the departure of the craft from a reference attitude, as established by the gyro vertical, about both its roll and pitch axes. The outputs of the pick-offs 22 and 25 are normally connected to supply attitude reference signals to utilization equipment such as a remote indicator (not shown) or the flight amplifier of an automatic pilot (not shown) or other equipment requiring craft roll and pitch attitude information for its successful operation. The output leads for the roll and pitch pick-offs are respectively indicated at 27 and 28 in Fig. 1.

In accordance with the invention, the gyro instrument further includes a device for setting the frame 14 quickly upon starting of the instrument that operates to exert a torque about the major axis of the frame and to positively lock the ring 11 at the erected condition of the frame. Such device as indicated at 29, in Figs. 1 and 2 includes an electromagnet 30 and an armature 31. The magnetically permeable elements of the electromagnet 30 are formed of a U-shaped part 32 and a central cylindrical part 33, the end surface of part 33 providing one pole piece and the end surfaces of the part 32 providing the other pole piece. The relative arrangement of the poles of the core structure of the electromagnet and the armature 31 is clearly depicted in Fig. 1. The electromagnet 30 further includes a coil 34 that is wound about the central pole providing piece 33. The fixed element of the torquing device 29, in this instance the electromagnet, is also suitably connected to the casing 10 as particularly shown in Fig. 3. The armature 31 of the device 29 is of sufficient width as to extend beyond the poles provided by the U-shaped part of the core of the electromagnet. The body of the armature is preferably V-shaped as clearly shown in Figs. 1 and 3, the apex of the armature having a flat surface 35 that is adapted to engage the end of the pole piece part 33 to lock the frame 14 through the ring 11 in an erected condition during the starting operations of the instrument. Armature 31 is connected to ring 11 by a flexible connection 36 which facilitates movement of the armature relative to the electromagnet along or in a diretion parallel to the major axis of the frame 14. Through connection 36 the armature 31 and ring 11 to which it is connected are influenced by the field of the electromagnet to exert a quick setting torque about the axis of the ring as will be hereinafter more fully described. In this operation, as the apex of the armature approaches the pole piece 33, the armature is pulled in rotation about the ring axis as well as being translated along or parallel to this axis until the part 35 thereof comes adjacent to the electromagnet pole piece 33 and then into locking engagement therewith. The full line position of the armature in Fig. 3 shows the same in locked condition with the electromagnet. The dotted line positions of the armature in Fig. 3 show relative locations of the parts when the device is functioning solely as a torquing means.

With reference to Fig. 1, the starting arrangement for the improved gyro instrument, as shown, may further include a compound starting switch formed of individual switches 37, 38 and 39 that are ganged by a suitable mechanical connection 40 to function as a single switch. Switch 39 connects the starting system to a direct current source of electrical energy. Switches 37 and 38 connect the starting system to an alternating current source of electrical energy. Further elements employed in the improved starting arrangement include an alternating current relay 41, a pair of direct current relays 42, 43, a pair of time delay or thermal relays 44, 45, and a thermostat control 46. The relay 41 serves as an interlock in the system.

The starting circuit of the improved instrument connects coil 34 of electromagnet 30 with the direct current source of electrical energy supplied the system by way of closed switch 39. Such starting circuit includes the relays 41, 42, 43, 44 and 45. Alternating current relay 41 functions as a (interlocking) relay that closes the starting circuit when the starting switches of the system are closed. The coil of relay 41 as indicated at 47 is energized by way of leads 48, 49 through transformer 50 from the alternating current source supplied through closed switch 37. Such energization locks the armature 51 against the contact 52 of the relay 41 to close the starting circuit so that the voltage from the direct current source by way of closed switch 39 is applied across the resistor heating element 53 of relay 44 by way of leads 54, 55.

Relay 44 includes a normally open switch 56 that closes against contact 57 after a predetermined time interval, for example five seconds, for the purpose of connecting the electrical source and the rotor spinning means of the gyroscopic instrument as hereinafter described in detail. The function of the relay 44 in the improved starting arrangement is to delay the energization of the rotor spinning means of the instrument for a predetermined time after the starting circuit is closed by operation of the starting switches 37, 38 and 39.

At the same time energy from the direct current source is supplied the coil 58 of relay 43 by way of lead 54, the closed switch 59 and contact 60 of relay 45, lead 61, through the parallel connected coil 58 to the return lead 55. Relay 43 includes a plurality of mechanically connected armatures 62, 63, 64, 65 and 66. Armature 62 connects with one of contacts 67, 68, and armatures 63, 64, 65 and 66 connect with the respective contacts 69, 70, 71 and 72. With the parts of relay 43 positioned as shown in Fig. 1, the pick-offs 25 and 22 are connected to function in a normal manner in supplying output data to leads 27, 28. As connected, the rotors 24 and 26 of the pick-offs are shown as energized from the source obtained through closed switch 37 by way of leads 73, 74 to common lead 75, armature 62, contact 68 and lead 76 to the secondary of transformer 50. The connection to the transformer is such as to supply alternating current to the circuit at a desired relative low voltage. The output from roll pick-off 22 is supplied the utilization apparatus by way of lead 77 and lead 78 and to lead 27. The output from pitch pick-off 25 is supplied the utilization apparatus by way of lead 79 to lead 28.

Relay 43 in the starting circuit functions when energized as a switching means operable to convert the pick-offs 22 and 25 to torque motors to erect the frame 14 of the instrument. To effect this result, the armature 62 of the energized relay 43 engages contact 67, armature 63 engages contact 69, armature 64 engages contact 70, armature 65 engages contact 71 and armature 66 engages contact 72. The rotors and stators of the respective pick-offs are then energized at different voltage levels by the following circuits. The rotors 24 and 26 of the pick-offs are then energized from transformer 50 by lead 80 tapped to the secondary of the transformer 50 at a higher voltage level than lead 76. The circuit is closed through the contact 67 and armature 62 of relay 43 by way of lead 75 and the respective leads 73, 74 through the rotors to ground. The stator of pick-off 22 is energized at a lower voltage level by way of low voltage lead 76, lead 81, contact 69, armature 63, and lead 82 to the stator. The circuit from the stator includes lead 77, lead 78, armature 65, contact 71, lead 83 and by way of the phasing network 84 back to lead 78. One of the windings of the rotor of pick-off 22 is connected to ground. The stator of pick-off 25 is energized at a lower voltage level by way of low voltage lead 76, lead 81, contact 70, armature 64, and lead 85 to the stator. The circuit from the stator includes lead 79, armature 66, contact 72, lead 83 and by way of the phasing network 84 back to lead 79. One of the windings of the stator of pick-off 25 is also connected to ground.

Leads 55 and 61 of the starting circuit supply energy from the direct current source to the coil of the electromagnetic torquing and locking device 29.

Relay 45 of the improved starting arrangement constitutes a means for disabling the starting circuit after a predetermined time interval to disconnect the source and device 29 and restore the pick-offs to normal operation. The heating resistor 86 of time delay or thermal relay 45 is connected across leads 54, 55 by way of lead 87, by-pass switch 88, lead 89, contact 90 and armature 91 of relay 42 and lead 92. The coil of relay 42 is indicated at 93. The remaining contacts and armature parts of relay 42 are indicated at 94—95, 96—97 and 98—99 respectively. Leads 100, 101 and 102 connect switch 38 and the respective contacts 94, 96 and 98. Leads 103, 104 and 105 connect the respective armatures 95, 97 and 99 to the winding of the motor constituting the means for spinning the gyroscopic rotor of the improved instrument. Thermostat 46 is mechanically coupled to the switch 88 to open the lead bypassing the resistor 106 to change the time interval of the effectiveness of the portion of the starting circuit that supplies energy to relay 43 and device 29 simultaneously. At such time in the starting operation that relay 43 and electromagnet 29 are energized, the frame is torqued by the pick-offs 22 and 25 and by the device 29 to an erected condition at which time the armature 31 of device 29 also engages the central pole 33 of the electromagnet to lock the ring.

The effectiveness of the quick setting device 29 and torque functioning pick-offs 22 and 25 extends over the period of time that elapses while resistor 53 of time delay or thermal relay 44 is heating up. After an interval of the selected five seconds, switch 56 of relay 44 engages the contact 57 and closes a circuit across leads 54, 55 that includes the coil 93 of the relay 42. In the further operation of the improved starting arrangement, the energization of relay 42 closes the armatures 95, 97 and 99 with the respective contacts 94, 96 and 98 thereby connecting the source of alternating current energy at closed switch 38 with the windings of the motor that spins the gyroscopic rotor of the device. Such connection is attained by way of leads 100, 101, 102 and leads 103, 104, 105, by way of the relay 42. During the acceleration of the gyro rotor of the instrument from a standstill condition, device 29 is effective to hold the ring 11 and frame 14 about the major axis of the instrument. It will be understood that in normal operation of the instrument after the starting period is over the switches 37, 38 and 39 are closed, relays 41 and 42 are energized and the switch 56 of relay 44 is closed. Such condition remains as long as the instrument is functioning and switches 37, 38 and 39 are closed.

The circuit including the heating resistor 86 of relay 45 is also closed when relay 42 is energized by closure of armature 91 and contact 90. The thermostat control 46 is regulated so that above a temperature condition of for example −30° centigrade, the switch 88 is closed. When the instrument is subject to temperature conditions below this selected value the thermostat control 46 is effective to open the switch so that the normally shunted resistor 106 is then included in the circuit containing the heating resistor 86 of relay 45. With the resistor 106 bypassed or rendered ineffective in the starting circuit, the relay 45 is effective to open the starting circuit at switch 59 and contact 60 to disconnect the device 29 and relay 43 from the source by which the same are energized. This disables device 29 and restores the pick-offs 22 and 25 to normal operation. The time required by relay 45 for operation may be for example two seconds so that normally in starting the period of effectiveness of device 29 and torquing pick-offs 22 and 25 may be seven seconds. The resistor 106 in the heating circuit for relay 45 may be considered to constitute a normally ineffective means for extending the time interval of the effectiveness of the starting circuit. Thermostat control 46 and switch 88 constitutes a thermally responsive means for automatically rendering the normally ineffective above noted means effective when the instrument is started when subject to temperature below a predetermined value. In such an instance depending on the size of resistor 106, the time required for switch 59 and contact 60 to open in relay 45 may be extended to for example thirty seconds. Relay 44 operates with a time delay of less than the time delay of relay 45 to connect the energizing source and the rotor spinning means for the rotor 17.

The operation of the starting arrangement of the present invention may now be explained in more detail. The present invention is particularly adaptable to use in vertical gyroscopes which have a very low pendulosity constant. When such a gyro is erected by means of a ball erector such as herein illustrated and the gyro is not in use, the rotor frame is very unstable about its vertical axis and the balls 15 will roll to the low side of their container and group themselves at a position radially displaced from the axis of rotation of the container thereby tipping the gyro rotor frame 14 to a considerable angle with the vertical axis of the instrument. Thus, if there is no initial erection of the rotor frame when the power is turned on, the gyro would nutate violently and damage its delicate support bearings and furthermore it would take an intolerably long period of time before the balls would operate in their normal fashion to erect the gyro to its normal vertical condition. Therefore, the signal generators 22 and 25 are converted to motors through the switching relay 43 to bodily rotate the rotor case 14 quickly to a nearly erect position before the current is applied to the rotor spinning motor. As is known, a selsyn-type pick-off operates from a predetermined null or zero signal position and conversely when it is converted to a motor it exerts no torque at this null position and only a very low torque near this position. By our invention we have provided means for applying an additional centralizing torque near this low torque position which means also serves to heavily damp the action of the motor near this position. The means for accomplishing the above comprises the electromagnet and armature device 29 which, in the embodiment illustrated, is effective about the major axis 11, 12 of the gyro instrument, but, of course, similar means may or may not be provided about the minor axis. In the present embodiment, the pick-off 22, operating as a motor, will rotate the gimbal 11 from relatively large angular displacements about the major axis to a position wherein the wings of the V-shaped armature come into and are influenced by the magnetic field set up by the electromagnet 30, 32 at which point the electromagnet device exerts an additional torque to erect the frame 14 about the major axis. When the gyro has reached a substantially erect position, the armature 31 is pulled or translated in a direction parallel to the major axis, into engagement with the pole piece 33 thereby damping the motor action of pick-off 22 by positively locking the gimbal 11 about the major axis.

The motor action of the converted pick-off 25 is the same as the motor action of pick-off 22. In this case, the rotor bearing frame 14 is bodily rotated about its minor axis to a nearly erect position. However, since the torque produced by motor action of the pick-off 25 decreases as it approaches its zero or null position, an additional torque may be required for quickly erecting the rotor bearing frame to a fully erect position. This additional erecting torque is obtained after the electromagnet device 29 is deenergized, through an inherent characteristic of a gyroscope, namely the tendency of the spin axis to align itself to a position normal to the plane of its supporting gimbal ring when the rotor is accelerating and the gimbal ring is unrestrained about its support axis. Such an effect is produced by an acceleration reaction torque acting on the gyro rotor case. With the above-described relation between the times of operation of relays 44 and 45 and the time required for accelerating the rotor up to operating speed, the rotor spinning motor 20 is still accelerating the rotor at the time electromagnet 29 is deenergized thereby enabling the acceleration reaction torque to be effective. This tendency of a gyro to erect itself about its minor axis is brought about by a component of the acceleration reaction torque of the rotor spinning motor acting on the rotor bearing frame. The direction and magnitude of this component is determined by the amount and direction the spin axis is misaligned with the vertical to the plane of the gimbal, the direction of spin of the rotor, and the acceleration of the rotor and reflects itself in a precession of the rotor case or frame to a position at which the rotor acceleration reaction component will be zero; i. e., when the spin axis of the rotor is normal to the plane of the gimbal. In the present case, this acceleration reaction torque is advantageously available to finally erect the spin axis to a substantially vertical position about the minor or pitch axis, a position well within the normal range of operation of the ball erector 17.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:
1. In a gyroscopic instrument, a casing, a rotor frame, a gimbal ring supporting said frame with freedom about major and minor, mutually perpendicular axes, a device for setting said frame quickly upon starting of the instru- ment operable to exert a torque about the major axis of the frame and to lock said ring at the erected position of the frame about its major axis including an electromagnet and an armature so arranged on the casing and ring that the same are movable relatively to one another in a direction substantially parallel to the major axis of the frame to an engagable ring locking condition, and a starting switch connecting the electromagnet with a power source.

2. An instrument as claimed in claim 1, in which the electromagnet is fixedly mounted on the casing and the armature is mounted on said ring by a flexible connection permitting the same to move relatively to the electromagnet in a direction substantially parallel to the major axis of the frame.

3. In a gyro vertical instrument, a casing, a rotor frame, a gimbal ring supporting said frame with freedom about major and minor, mutually perpendicular, normally horizontal axes, a device for setting said frame quickly upon starting of the instrument operable to exert a torque about the major axis of the frame and to lock said ring at the erected condition of the frame about its major axis including an electromagnet fixed to said casing and an armature movable with said ring, a flexible connection between said armature and ring facilitating movement of the same relative to said electromagnet in a direction substantially parallel to the major axis of the frame, and a starting circuit for energizing the electromagnet.

4. An instrument as claimed in claim 3 in which said electromagnet includes a central pole piece, and the body of said armature is V-shaped, the apex of which has a flat surface adapted to engage the end of the pole piece.

5. An instrument as claimed in claim 3, including means in said starting circuit operable to disable the circuit after a predetermined time interval, normally ineffective means for extending the time interval of the effectiveness of the starting circuit, and thermally responsive means for automatically rendering said normally ineffective means effective when the instrument is started when subject to temperature below a predetermined value.

6. In a gyroscopic instrument, a casing, a rotor frame, a gimbal ring supporting said frame with freedom about major and minor, mutually perpendicular axes, a device for setting said frame quickly upon starting of the instrument operable to exert a torque about the major axis of the frame including an electromagnet and an armature, one of which is connected to the casing and the other of which is connected to the ring, a source of electrical energy, a starting circuit connecting the source and electromagnet including means operable to disable the circuit after a predetermined time interval, normally ineffective means for extending the time interval of the effectiveness of said starting circuit, and thermally responsive means for automatically rendering said normally ineffective means effective when the instrument is started when subject to temperature below a predetermined value.

7. In a gyroscopic instrument, a casing, a universally supported rotor frame, an auxiliary torquing device for setting the frame quickly upon starting of the instrument including an electromagnet and an armature, one of which is connected to the casing and the other of which is operatively connected to the frame, a source of electrical energy, a starting circuit connecting the source and electromagnet including means operable to disable the circuit after a predetermined time interval, normally ineffective means for extending the time interval of the effectiveness of said starting circuit, and thermally responsive means for automatically rendering said normally ineffective means effective when the instrument is started when subject to temperature below a predetermined value.

8. In a gyroscopic instrument, a universally supported rotor frame, an auxiliary torquing device for setting the frame quickly upon starting of the instrument, a starting circuit for connecting said device to a power source including means operable to disable the circuit after a predetermined time interval, normally ineffective means for extending the time interval of the effectiveness of the starting circuit, and thermally responsive means for automatically rendering said normally ineffective means effective when the instrument is started when subject to temperature below a predetermined value.

9. A starting arrangement for gyro instruments having a universally supported rotor frame with freedom about major and minor axes, an electrical pick-off at the major axis of the frame, an auxiliary torquing device for setting the frame quickly about its major axis including an electromagnet and an armature, a starting circuit for energizing the device and the pick-off including switching means effective to convert said pick-off to a torque motor, means for disabling said starting circuit after a predetermined time interval to disconnect the source and device and restore the pick-off to normal operation, normally ineffective means for extending the time interval of the effectiveness of said starting circuit, and thermally responsive means for automatically rendering said normally ineffective means effective when the instrument is started when subject to temperature below a predetermined value.

10. A starting arrangement for gyro verticals having a universally supported rotor frame with freedom about major and minor horizontal axes, electrical signal generating pick-offs at said axes, an auxiliary torquing device for setting the frame quickly about its major axis including an electromagnet and an armature, a starting circuit including switching means for connecting the device with a source of electrical energy and means including switching means for converting said pick-offs to torque motors, and means for disabling said starting circuit after a predetermined time interval to deenergize said device and to restore the pick-offs to normal signal generating operation.

11. A starting arrangement for gyro instruments having a universally supported rotor frame with freedom about major and minor axes, an electrical signal producing pick-off at the major axis of the frame, an auxiliary torquing device for setting the frame quickly about its major and minor axes including an electromagnet and an armature, a starting circuit including switching means for energizing said device and means including switching means effective to convert said pick-off to a torque motor, and means for disabling said starting circuit after a predetermined time interval to deenergize said device and to restore the pick-off to normal signal producing operation.

12. A starting arrangement for gyro instruments comprising a rotor, driving means for said rotor, a rotor bearing frame, and gimbal means for supporting said frame for universal movement about major and minor axes, the combination with motive means for rotating said frame about one of said axes to a predetermined position and for positively locking said frame in said position, means for energizing said rotor drive means, and means operative at a predetermined time interval after energization of said rotor drive means for rendering said motive means inoperative.

13. A starting arrangement for gyro instruments comprising a rotor, driving means for said rotor, a rotor bearing frame, and gimbal means for supporting said frame for universal movement about major and minor axes, the combination with motive means for rotating said frame about one of said axes to a predetermined position and for engaging said frame at said position whereby to lock said frame against rotation about said axis, first means for energizing said motive means, second means operative in timed relation with said first means for energizing said rotor drive means, and means operative in timed relation with said second means for deenergizing said motive means.

14. A starting arrangement for gyro instruments comprising a rotor, driving means for said rotor, a rotor bearing frame, and gimbal means for supporting said frame for universal movement about major and minor axes, motive means for rotating said frame about one of said axes to a predetermined position, electromagnetic means for locking said frame at said predetermined position, first means for energizing said motive means and said electromagnetic means, means operative in timed relation with said first means for energizing said rotor drive means, and means operative in timed relation with said last-mentioned means for deenergizing said electromagnetic means.

15. A starting arrangement for gyro instruments comprising a rotor, driving means for said rotor, a rotor bearing frame, and gimbal means for supporting said frame for universal movement about major and minor axis, a first erection means effective during normal operation of the instrument for erecting said frame from normal small angular displacements about said axes, a second erection means effective during the starting of said instrument for erecting the frame from relatively large angular displacements about said axes comprising motive means for rotating said frame about one of said axes to a position within the range of operation of said first erection means and for mechanically locking the same at said position, first switch means for energizing said motive means, second switch means operative in timed relation with said first switch means for energizing said rotor drive means, and switch means operative in timed relation to said second switch means for deenergizing said motive means.

16. A starting arrangement for gyro instruments having a rotor, a rotor-bearing frame, and gimbal means for supporting said frame for universal movement about major and minor axes, a first erection means effective during normal operation of the instrument for erecting said frame from normally small angular displacements about said axes, electrical signal generating means at each of said axes for normally providing signals indicative of angular displacements of said frame about said axes, a second erection means effective during starting of said instrument for erecting the frame from relatively large angular displacements about said axes comprising a starting circuit including switching means for energization of said generators as motors, said motors being adapted upon energization to rotate said frame to a position within the range of operation of said first erection means, and electromagnet means energized by said switching means for damping the movement of the motor effective about said major axis and simultaneously locking said frame about the latter axis whereby to eliminate nutations of said frame as the rotor is spun up to operating speed.

17. A starting arrangement for gyro instruments as claimed in claim 16 wherein said switching means includes means for disabling said starting circuit after a predetermined time interval to deenergize said electromagnet means and to reconnect said motors as signal generators.

18. A starting arrangement for gyro instruments having a rotor, a rotor-bearing frame, and gimbal means for supporting said frame for universal movement about major and minor axes, a first erection means effective during normal operation of the instrument for erecting said frame from normally small angular displacements about said axes, electrical signal generator means at each of said axes for normally providing signals indicative of angular displacements of said frame about said axes, a second erection means effective during starting of said instrument for erecting the frame from relatively large angular displacements about said axes comprising a starting circuit including switching means for energizing at least one of said generators as a motor, said motor being adapted upon energization to rotate said frame about at least one of said axes to a position generally in the range of operation of said first erection means, and electromagnet means energized by said swtiching means for damping the movement of the motor effective about said one axis within the range of operation of said first erection means and simultaneously locking said frame about said latter axis whereby to eliminate nutations of said frame as the latter is spun up to operating speed.

19. A starting arrangement for gyro instruments as claimed in claim 18 wherein said switching means includes means for disabling said starting circuit after a predetermined time interval to deenergize said electromagnet means and to reconnect said one motor as a signal generator.

References Cited in the file of this patent

UNITED STATES PATENTS

| | | |
|---|---|---|
| 2,523,270 | Barkalow et al. | Sept. 26, 1950 |
| 2,555,981 | Lynch et al. | June 5, 1951 |
| 2,561,367 | Haskins, Jr. | July 24, 1951 |
| 2,567,948 | Lane | Sept. 18, 1951 |
| 2,605,641 | Barkalow | Aug. 5, 1952 |